(12) United States Patent
Liu

(10) Patent No.: US 8,027,167 B2
(45) Date of Patent: Sep. 27, 2011

(54) CASE CABLE MANAGEMENT

(75) Inventor: Han Liu, Fremont, CA (US)

(73) Assignee: Antec, Inc., Fremont, CA (US)

( * ) Notice: Subject to any disclaimer, the term of this patent is extended or adjusted under 35 U.S.C. 154(b) by 394 days.

(21) Appl. No.: 12/379,830

(22) Filed: Mar. 3, 2009

(65) Prior Publication Data

US 2010/0224387 A1 Sep. 9, 2010

(51) Int. Cl.
*H05K 5/00* (2006.01)

(52) U.S. Cl. ............... 361/752; 439/620.39; 174/256; 324/756.04; 365/185.05

(58) Field of Classification Search .......... 439/77, 439/668, 65, 607.38, 620.39, 660; 385/75, 385/88; 235/441, 449; 361/749, 752, 714, 361/674, 679.01, 774, 679.04, 679.55, 679.32, 361/679.17, 679.57, 679.31, 679.58; 174/59, 174/359, 377, 260, 256, 261, 254; 348/294, 348/360; 324/754.07, 755.01, 756.04, 762.03; 365/210.1, 51, 185.05, 80.4, 194, 63, 230.03
See application file for complete search history.

(56) References Cited

U.S. PATENT DOCUMENTS

| 2006/0038012 | A1* | 2/2006 | Uchida et al. | 235/441 |
| 2010/0129035 | A1* | 5/2010 | Teo | 385/88 |
| 2010/0203747 | A1* | 8/2010 | Hu et al. | 439/77 |

* cited by examiner

*Primary Examiner* — Hung Duong
(74) *Attorney, Agent, or Firm* — Muncy, Geissler, Olds & Lowe, PLLC

(57) ABSTRACT

The case cable management has a shell, a circuit board, multiple sockets and a cover. The shell has a bottom board and a sidewall. The circuit board is attached securely to the bottom board of the shell. The sockets are mounted through the sidewall of the shell and have multiple terminals connected securely to the circuit board. The cover covers the shell. Multiple power lines are mounted through the sidewall of the shell to connect the circuit board and sockets to a power supply and cables from computer apparatuses are connected to the sockets to receive electric power. Different cables can be distinguished clearly and conveniently for simplified cable routing to avoid confusion and facilitate replacement.

20 Claims, 6 Drawing Sheets

CASE CABLE MANAGEMENT

BACKGROUND OF THE INVENTION

1. Field of the Invention

The present invention relates to a cable management, especially to a case cable management having simplified cable routing for a computer.

2. Description of the Prior Arts

Computers have become important tools in our daily lives. To achieve different requirements for users, many apparatuses are installed in a case and include hard disk, expansion cards, optical drives such as but not limited to CD-ROM (Compact Disc Read-Only Memory), DVD, holographic drive or the like. All these apparatuses have cables for connection to a power supply to receive electric power. However, increasing a number of installed apparatuses increases a number of connection cables inside the case. The intertwined cables are inconvenient when overhauling, replacing or expanding an apparatus.

A conventional cable management for computer is a binding cable thread. The binding cable thread is helically entwined to form a hollow tube and can bind many cables. However, when one apparatuses must be fixed, the binding cable thread must be entirely unwound. After completing repair, the user should helically re-entwine the binding cable thread. Further, adding another cable is inconvenient when expanding apparatuses. Moreover, encircling a binding cable thread in a small case is difficult.

To overcome the shortcomings, the present invention provides a case cable management to mitigate or obviate the aforementioned problems.

SUMMARY OF THE INVENTION

The main objective of the invention is to provide a case cable management having simplified cable routing for a computer.

The case cable management in accordance with the present invention has a shell, a circuit board, multiple sockets and a cover. The shell has a bottom board and a sidewall. The circuit board is attached securely to the bottom board of the shell. The sockets are mounted through the sidewall of the shell and have multiple terminals connected securely to the circuit board. The cover covers the shell. Multiple power lines are mounted through the sidewall of the shell to connect the circuit board and sockets to a power supply and cables from computer apparatuses are connected to the sockets to receive electric power. Different cables can be distinguished clearly and conveniently for simplified cable routing to avoid confusion and facilitate replacement.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
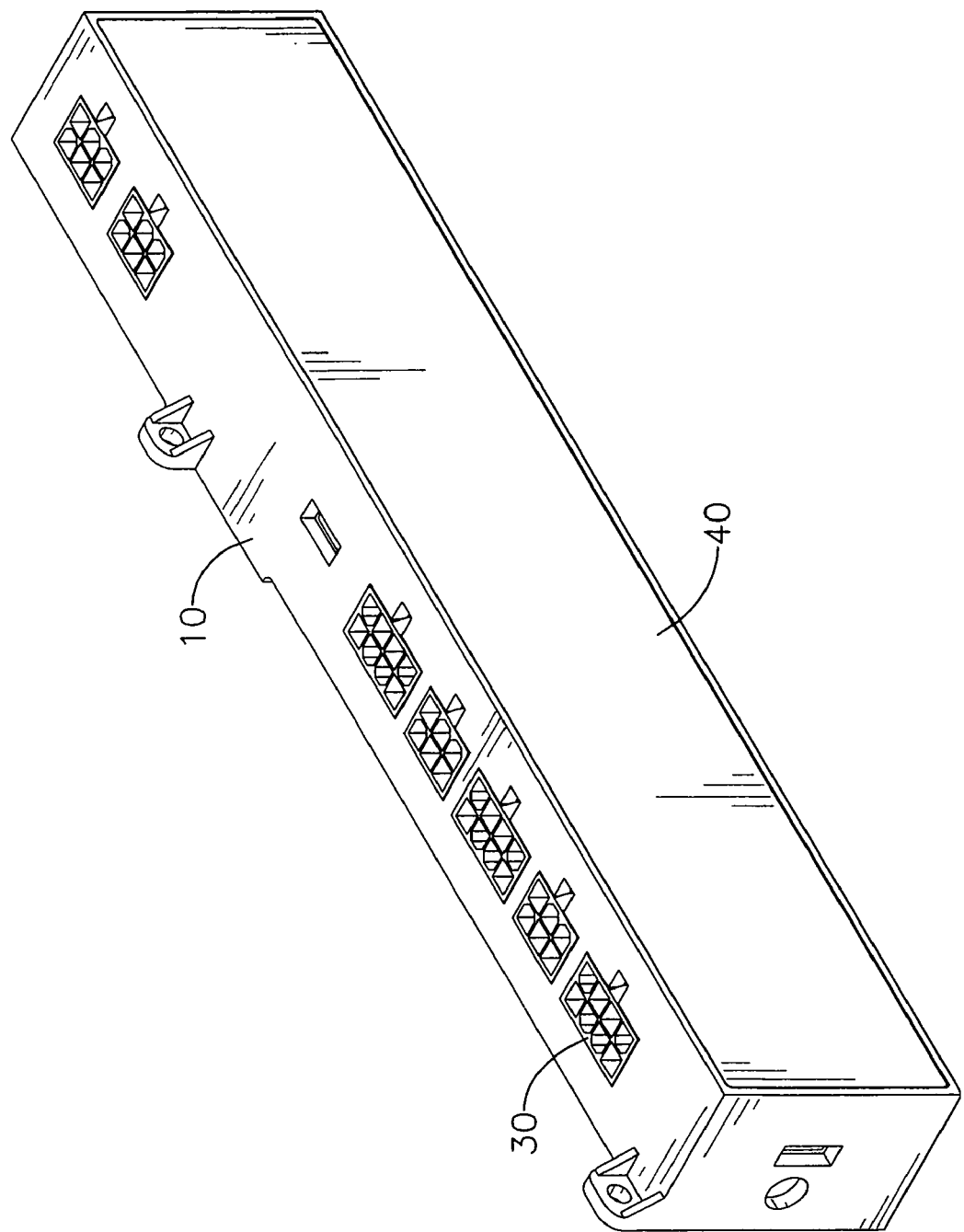
FIG. 1 is a perspective view of a case cable management in accordance with the present invention.
Figure 2:
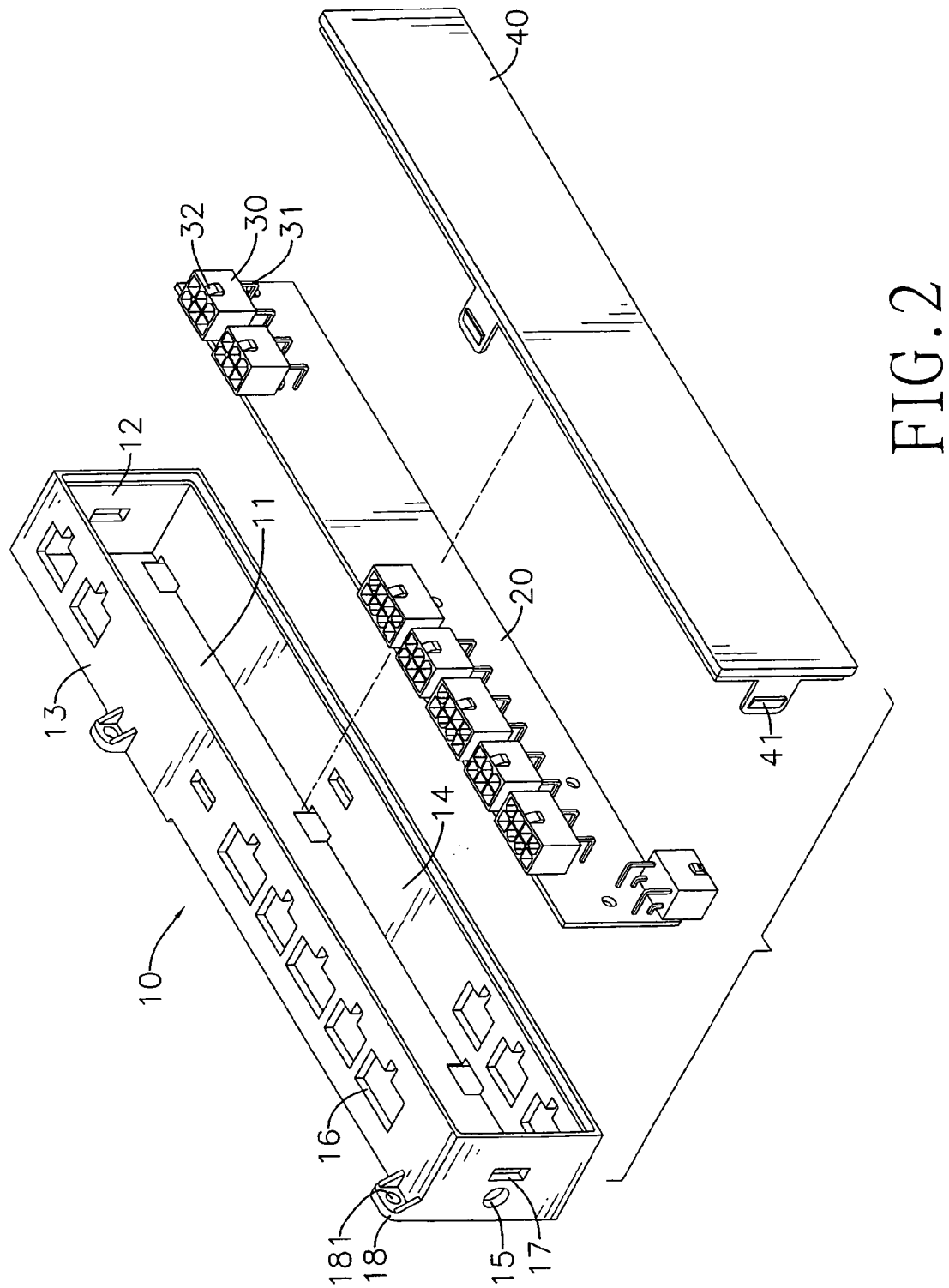
FIG. 2 is an exploded perspective view of the case cable management in FIG. 1.

With reference to FIGS. 1 and 2, a case cable management in accordance with the present invention comprises a shell (10), a circuit board (20), multiple sockets (30) and a cover (40).

The shell (10) has a bottom board (11), an annular sidewall, a space (14), an opening and may comprise a power hole (15), multiple inserting holes (16), multiple tab recesses (17) and multiple positioning tabs (18). The annular sidewall is formed around and protrudes from the bottom board (11) of the shell (10). The space (14) is defined between the bottom board (11) and the sidewall of the shell (10). The opening is formed opposite to the bottom board (11). The power hole (15) and inserting holes (16) are formed through the sidewall of the shell (10). The tab recesses (17) are formed in, may be formed through, the sidewall of the shell (10). The positioning tabs (18) are formed on and protrude from the sidewall of the shell (10) adjacent to the bottom board (11) to allow fasteners to mount the shell (10) securely and each positioning tab (18) has a positioning hole (181). The positioning hole (181) is formed through the positioning tab (18) of the shell (10) for mounting fasteners therethrough.

In a preferred embodiment, the bottom board (11) is rectangular, and the annular sidewall has two short sidewalls (12) and two long sidewalls (13). The space (14) is rectangular. The power hole (15) is formed through one short sidewall (12) of the shell (10). The inserting holes (16) are formed through the long sidewalls (13) of the shell (10). Four tab recesses (17) are respectively formed through the sidewalls (12, 13) of the shell (10). Two positioning tabs (18) are formed on and protrude from one long sidewall (13) adjacent to the bottom board (11) of the shell (10).

The circuit board (20) is mounted securely on the bottom board (11) of the shell (10) and in the space (14) of the shell (10) and has an end. The end of the circuit board (20) may be adjacent to the power hole (15).

The sockets (30) are mounted securely on the circuit board (20) and are mounted through the sidewall of the shell (10), may respectively correspond to and be mounted through the inserting holes (16) of the shell (10). Each socket has a body, multiple terminals (31) and an optional tab (32). The terminals (31) protrude from the body and are connected to the circuit board (20). The tab (32) is formed on and protrudes from the body.

The cover (40) corresponds to and covers the opening of the shell (10) and has an annular edge and multiple optional connecting tabs (41). The connecting tabs (41) are formed on and protrude from the annular edge of the cover (40), correspond to and are detachably mounted in the tab recesses (17) of the shell (10).

In the preferred embodiment, the cover (40) is rectangular and corresponds to the opening of the shell (10). The cover (40) has four connecting tabs (41) formed on and protruding from the annular edge of the cover (40) and each connecting tab (41) has a barb detachably mounted in the corresponding tab recess (17) of the shell (10) to securely fasten the shell (10) and the cover (40).

Figure 3:
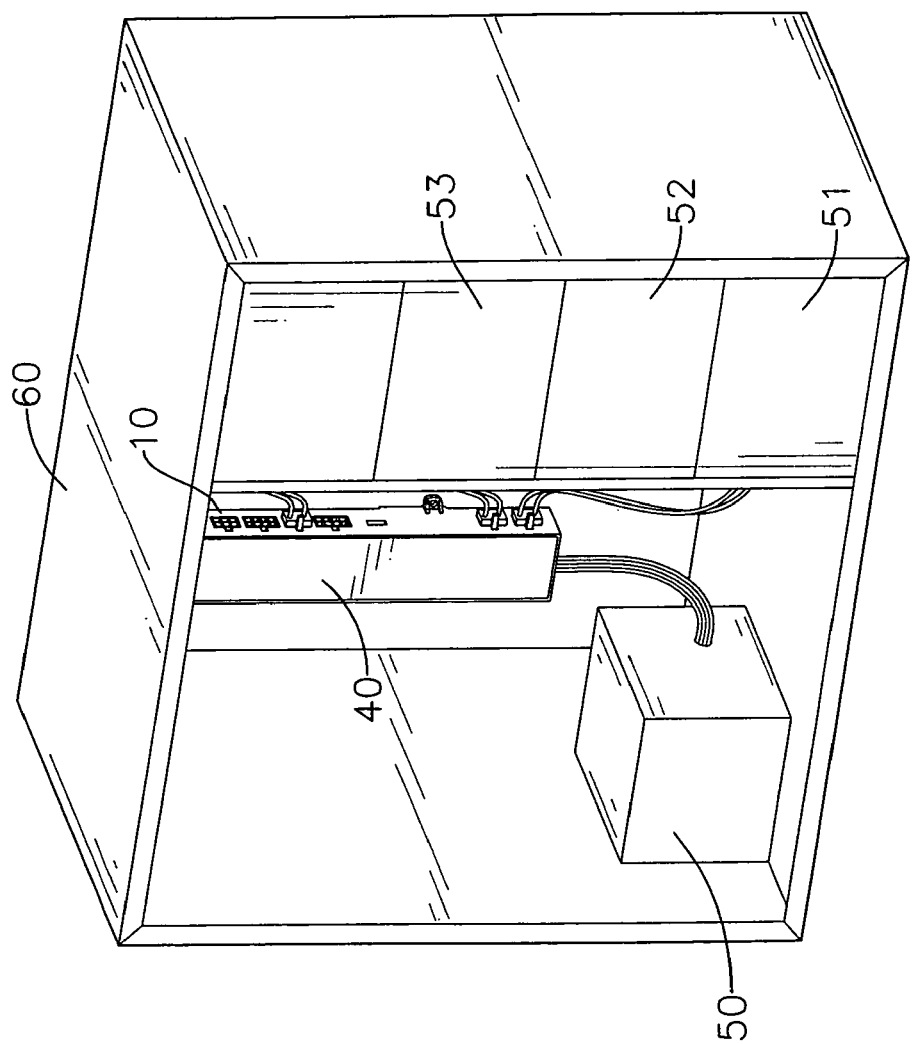
FIG. 3 is a perspective view of the case cable management in FIG. 1 being mounted in the case.

With reference to FIG. 3, a computer has a power supply (50) and multiple electronic devices of the computer. The electronic devices of computer may include but is not limited to a hard disk (51), a display card (52), an optical drive (53) such as CD-ROM, DVD, holographic drive or the like. The case cable management as described is mounted in the case (60) near the electronic devices using fasteners such as but not limited to screws mounted through the bottom board (11), maybe through the positioning tab (18), maybe through the positioning holes (181) of the shell (10).

Figure 4:
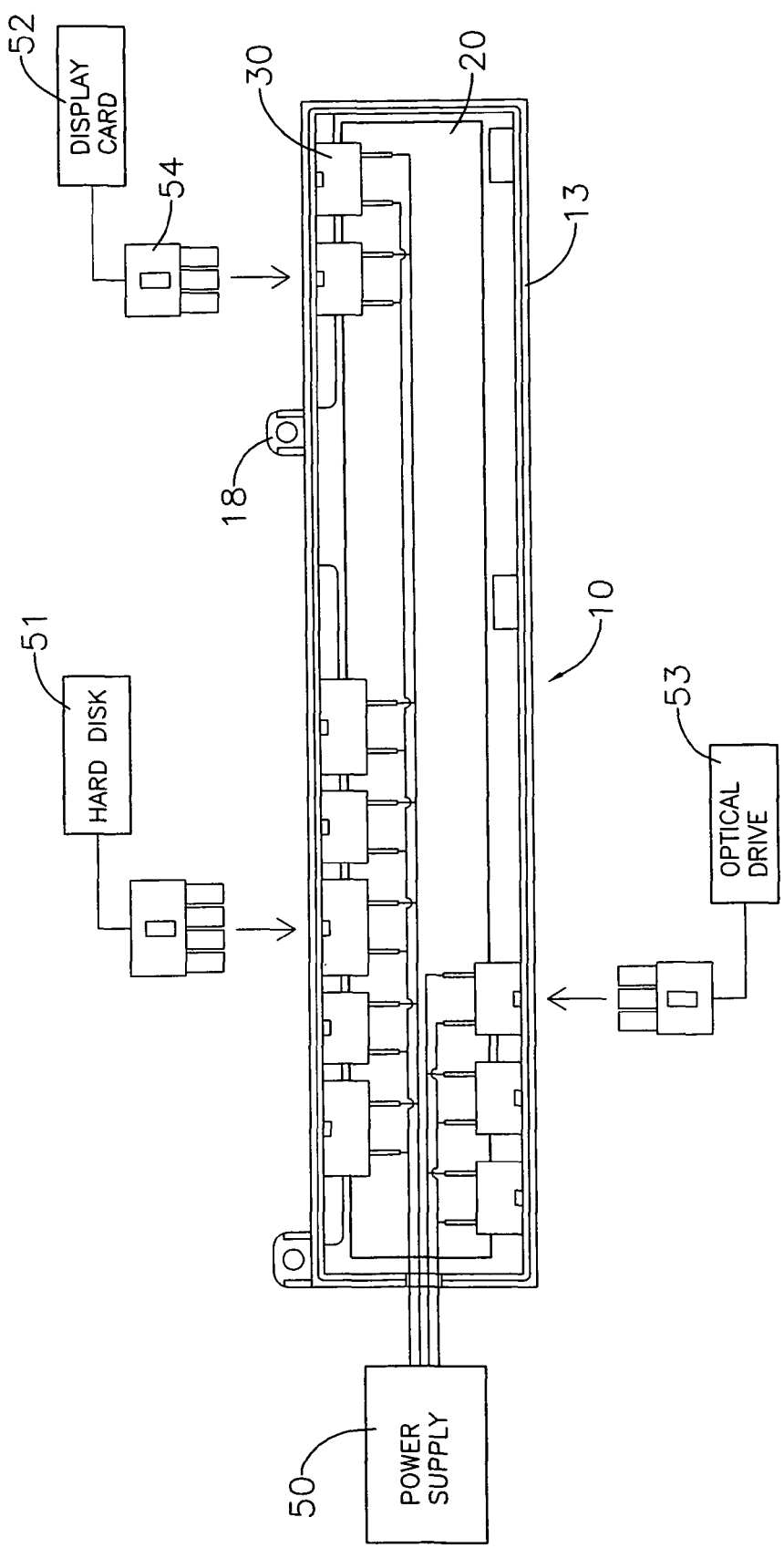
FIG. 4 is a schematic diagram of the case cable management in FIG. 3.

With further reference to FIGS. 3 and 4, multiple power lines from the power supply (50) are mounted through the shell (10), maybe through the power hole (15), to connect the circuit board (20), maybe via the end of the circuit board (20). Each electronic device has a cable. The cable has a distal end and a plug (54). The plug (54) is mounted on the distal end of the cable of the electronic device and connects to an exterior power socket. The plugs (54) of the electronic devices are respectively connected to corresponding sockets (30) so the cables of the electronic devices are managed as a single cable to connect to the power supply (50).

Figure 5:
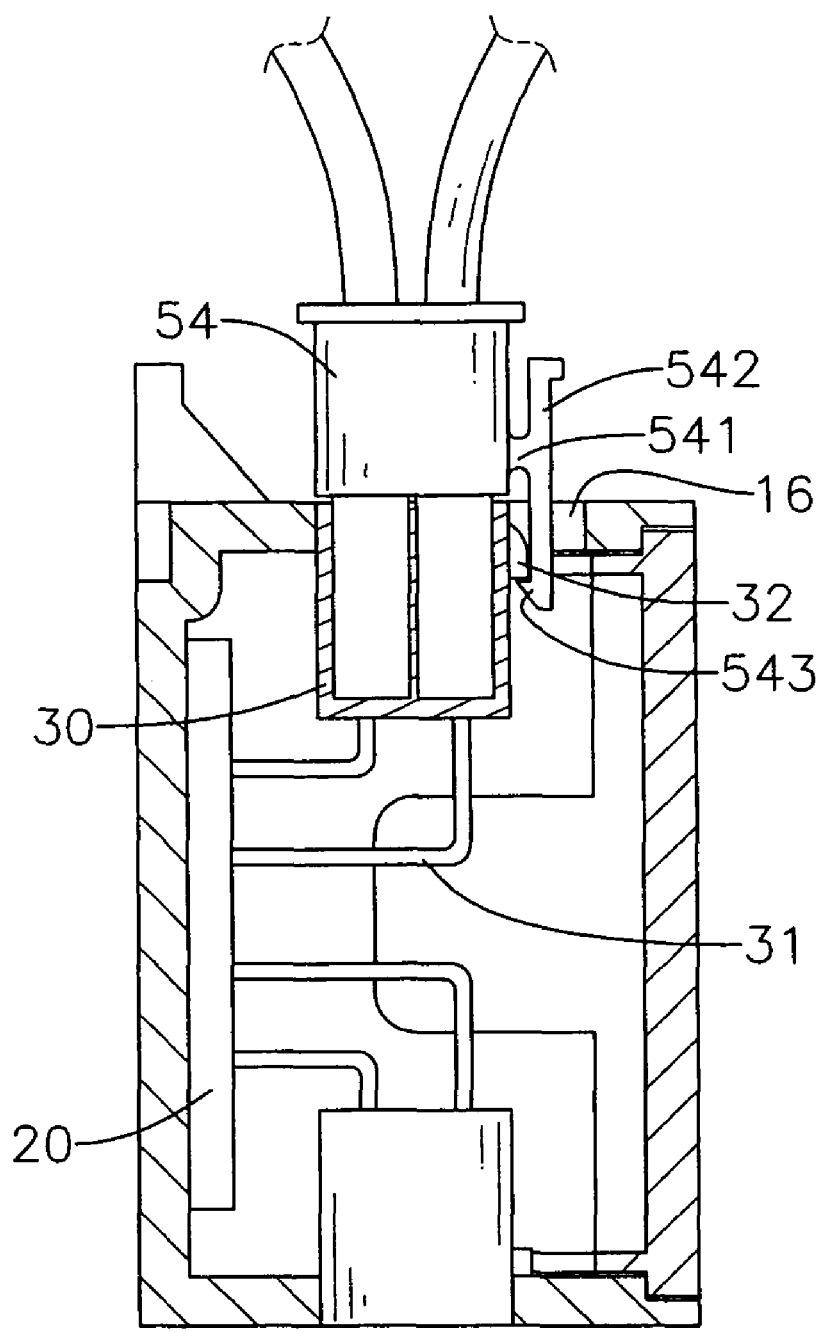
FIG. 5 is a side view in partial section of the case cable management in FIG. 1, showing a connection connected to the socket.

With further reference to FIG. 5, each plug (54) has a side and a latch (541). The latch (541) is formed on the side of the plug (54) and is detachably connected to a corresponding socket (30) and may comprise a lever (542) and a hook (543). The lever (542) is attached securely to the side of the plug (54) axially and has a distal end. The hook (543) is formed on and protrudes from the distal end of the lever (542) and detachably engages the tab (32) of the socket (30). The plug (54) may be disengaged from the socket (30) easily by pressing the lever (542) and pulling out the plug (54).

Figure 6:
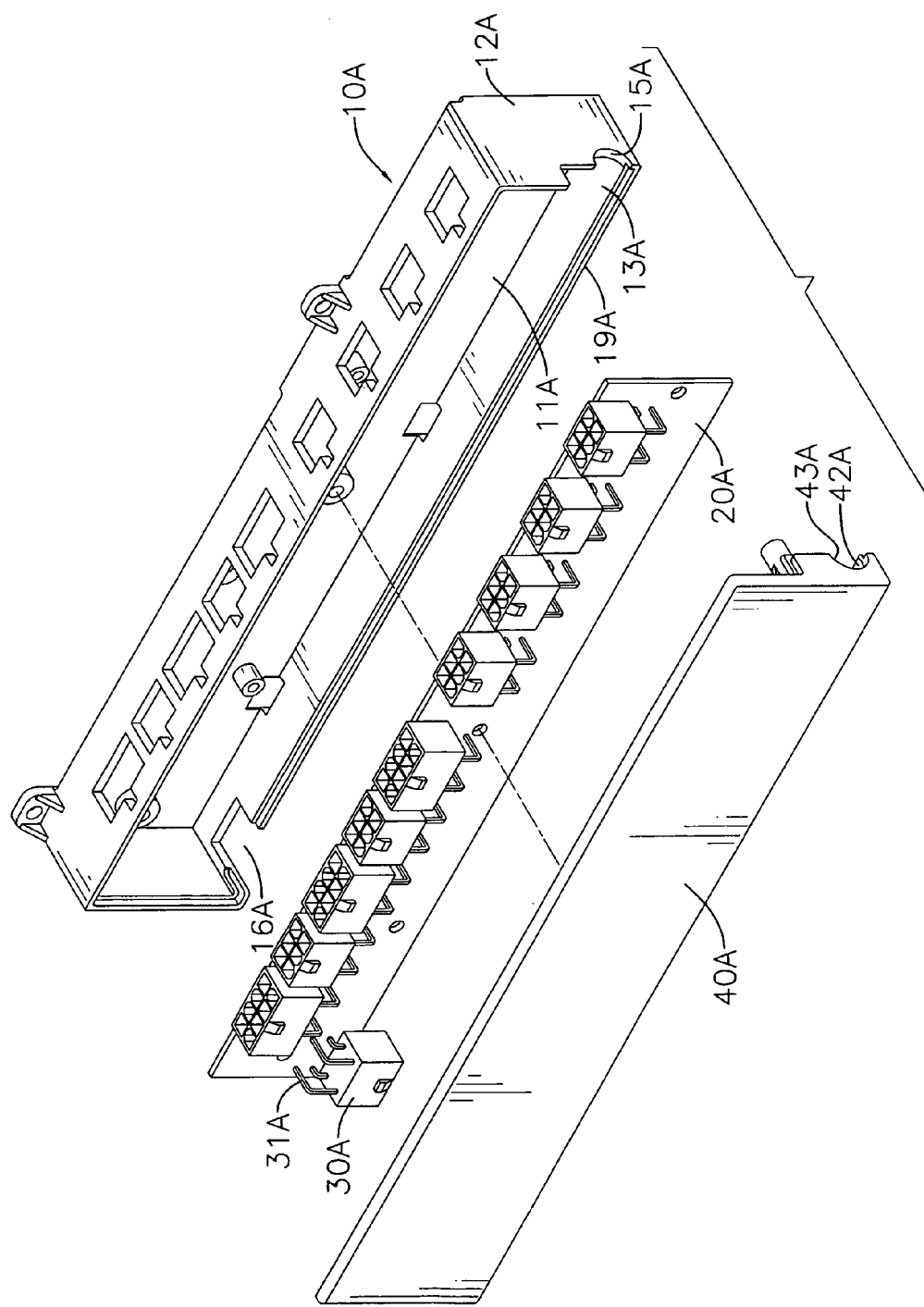
FIG. 6 is an exploded perspective view of a second embodiment of a case cable management in accordance with the present invention.

With further reference to FIG. 6, in a preferred embodiment, the shell (10A) further has an inserting hole (16A), an indentation (19A) and a notch (15A). The inserting hole (16A) is formed through one long sidewall (13A) of the shell (10A) and communicates with the opening of the shell (10A). The indentation (19A) is formed longitudinally through the long sidewall (13A) and communicates with the inserting hole (16A). The notch (15A) is formed in one short sidewall (12A) and communicates with the indentation (19A). The cover (40A) further has a protrusion (42A) and a notch (43A). The protrusion (42A) of the cover (40A) is formed on and protrudes from the annular edge of the cover (40A) and corresponds to and engages the indentation (19A) of the shell (10A). The notch (43A) is formed in the annular edge of the cover (40A) and corresponds to and communicates with the notch (15A) of the shell (10A) to allow the wires to be mounted conveniently. The terminals (31A) of the sockets (30A) on the circuit board (20A) are distant from the sidewalls of the shell (10A) because the circuit board (20A) with the sockets (30A) is mounted into the shell (10A) through the opening, the indentation (19A) and the inserting hole (16A). Therefore, the circuit board (20A) is inserted into the shell (10A) without barrier.

In a preferred embodiment, the case cable management in accordance with the present invention can be used outside a case to conveniently connect a power line of an expanded power supply (50) and the cables of the electronic devices to the case cable management to manage cables effectively.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A case cable management for a computer comprising:
   a shell having
      a bottom board;
      an annular sidewall being formed around and protruding from the bottom board of the shell;
      a space being defined between the bottom board and the sidewall of the shell; and
      an opening being formed opposite to the bottom board;
   a circuit board being mounted securely on the bottom board of the shell in the space of the shell;
   multiple sockets being mounted securely on the circuit board and being mounted through the sidewall of the shell and each socket having
      a body;
      multiple terminals protruding from the body and being connected to the circuit board; and
   a cover corresponding to and covering the opening of the shell and having an annular edge.

2. The case cable management as claimed in claim 1, wherein
   the shell has multiple tab recesses being formed in the sidewall of the shell; and
   the cover further has multiple connecting tabs being formed on and protruding from the annular edge of the cover, corresponding to and being detachably mounted in the tab recesses of the shell.

3. The case cable management as claimed in claim 2, wherein the shell further has multiple positioning tabs being formed on and protruding from the sidewall of the shell adjacent to the bottom board of the shell.

4. The case cable management as claimed in claim 3, wherein
   the bottom board of the shell is rectangular;
   the annular sidewall of the shell has two short sidewalls and two long sidewalls; and
   the bottom board of the cover is rectangular.

5. The case cable management as claimed in claim 4, wherein
   the tab recesses of the shell are respectively formed through the short and long sidewalls of the annular sidewall of the shell; and
   the positioning tabs of the shell are formed on and protrude from one long sidewall of the annular sidewall of the shell adjacent to the bottom board of the shell.

6. The case cable management as claimed in claim 5, wherein each connecting tab has a barb being detachably mounted in a corresponding tab recess of the shell.

7. The case cable management as claimed in claim 6, wherein
   the shell further has
      an indentation being formed in one long sidewall of the annular sidewall of the shell;
      an inserting hole being formed through the long sidewall of the annular sidewall of the shell and communicating with the opening of the shell and the indentation of the shell; and
      a notch being formed in one short sidewall of the annular sidewall of the shell and communicating with the indentation; and
   the cover further has
      a protrusion being formed on and protrudes from the annular edge of the cover and corresponding to and engaging the indentation of the shell; and a notch being formed in the annular edge of the cover and corresponding to and communicating with the notch of the shell.

8. The case cable management as claimed in claim 4, wherein each connecting tab has a barb being detachably mounted in a corresponding tab recess of the shell.

9. The case cable management as claimed in claim 2, wherein
the bottom board of the shell is rectangular;
the annular sidewall of the shell has two short sidewalls and two long sidewalls; and
the bottom board of the cover is rectangular.

10. The case cable management as claimed in claim 9, wherein
the tab recesses of the shell are respectively formed through the short and long sidewalls of the annular sidewall of the shell; and
the positioning tabs of the shell are formed on and protrude from one long sidewall of the annular sidewall of the shell adjacent to the bottom board of the shell.

11. The case cable management as claimed in claim 10, wherein each connecting tab has a barb being detachably mounted in a corresponding tab recess of the shell.

12. The case cable management as claimed in claim 11, wherein
the shell further has
an indentation being formed in one long sidewall of the annular sidewall of the shell;
an inserting hole being formed through the long sidewall of the annular sidewall of the shell and communicating with the opening of the shell and the indentation of the shell; and
a notch being formed in one short sidewall of the annular sidewall of the shell and communicating with the indentation; and
the cover further has
a protrusion being formed on and protrudes from the annular edge of the cover and corresponding to and engaging the indentation of the shell; and
a notch being formed in the annular edge of the cover and corresponding to and communicating with the notch of the shell.

13. The case cable management as claimed in claim 9, wherein each connecting tab of the cover has a barb being detachably mounted in a corresponding tab recess of the shell.

14. The case cable management as claimed in claim 2, wherein each connecting tab of the cover has a barb being detachably mounted in a corresponding tab recess of the shell.

15. The case cable management as claimed in claim 1, wherein the shell further has multiple positioning tabs being formed on and protruding from the sidewall of the shell adjacent to the bottom board of the shell.

16. The case cable management as claimed in claim 15, wherein
the bottom board of the shell is rectangular;
the annular sidewall of the shell has two short sidewalls and two long sidewalls; and
the bottom board of the cover is rectangular.

17. The case cable management as claimed in claim 16, wherein
the tab recesses of the shell are respectively formed through the short and long sidewalls of the annular sidewall of the shell; and
the positioning tabs of the shell are formed on and protrude from one long sidewall of the annular sidewall of the shell adjacent to the bottom board of the shell.

18. The case cable management as claimed in claim 1, wherein
the bottom board of the shell is rectangular;
the annular sidewall of the shell has two short sidewalls and two long sidewalls; and
the bottom board of the cover is rectangular.

19. The case cable management as claimed in claim 18, wherein
the tab recesses of the shell are respectively formed through the short and long sidewalls of the annular sidewall of the shell; and
the positioning tabs of the shell are formed on and protrude from one long sidewall of the annular sidewall of the shell adjacent to the bottom board of the shell.

20. The case cable management as claimed in claim 3, wherein each connecting tab of the cover has a barb being detachably mounted in a corresponding tab recess of the shell.

\* \* \* \* \*